(12) United States Patent
Chen et al.

(10) Patent No.: US 12,532,068 B2
(45) Date of Patent: Jan. 20, 2026

(54) MULTI-CHANNEL IMAGE AND VIDEO STREAM SYNCHRONIZATION AND DISTRIBUTED PROCESSING METHOD AND SYSTEM BASED ON 5G ENVIRONMENT

(71) Applicant: HUANENG SHANGHAI SHIDONGKOU SECOND POWER PLANT, Shanghai (CN)

(72) Inventors: Siqin Chen, Shanghai (CN); Feng Liu, Shanghai (CN); Jun Shen, Shanghai (CN); Xiaodong Zhang, Shanghai (CN); Liren Zhou, Shanghai (CN); Yuqing Sang, Shanghai (CN); Zhen Zhu, Shanghai (CN); Tianyi Sun, Shanghai (CN); Chunyan Huang, Shanghai (CN)

(73) Assignee: HUANENG SHANGHAI SHIDONGKOU SECOND POWER PLANT, Shanghai (CN)

( * ) Notice: Subject to any disclaimer, the term of this patent is extended or adjusted under 35 U.S.C. 154(b) by 401 days.

(21) Appl. No.: 17/697,940

(22) Filed: Mar. 18, 2022

(65) Prior Publication Data

US 2023/0156324 A1    May 18, 2023

(30) Foreign Application Priority Data

Nov. 15, 2021    (CN) .......................... 202111349750.6

(51) Int. Cl.
*H04N 23/661*   (2023.01)
*H04N 7/18*     (2006.01)
*H04W 84/04*    (2009.01)

(52) U.S. Cl.
CPC .......... *H04N 23/661* (2023.01); *H04N 7/181* (2013.01); *H04W 84/042* (2013.01)

(58) Field of Classification Search
CPC ............................ H04N 23/661; H04N 7/181
See application file for complete search history.

(56) References Cited

U.S. PATENT DOCUMENTS

9,294,735 B2 *  3/2016  Matsumoto .......... H04N 23/662
9,514,371 B1 * 12/2016  Renkis ................. G02B 27/017
(Continued)

*Primary Examiner* — Boubacar Abdou Tchoussou
(74) *Attorney, Agent, or Firm* — IDEA Intellectual Limited; Sam T. Yip (57) ABSTRACT

A method for synchronized and distributed processing multi-channel image and video stream based on 5G environment is provided, including: transmitting multi-channel the same pulse signals to a data collecting circuit by a pulse transmitter, the data collecting circuit transmits the pulse signal to an image capturing circuit, and the image capturing circuit triggers a camera capturing system to start to simultaneously capture images and video stream. Distributing multi-channel traffic of the cameras via distributed edge computing and distribution processing, so as to locally process the captured images and video stream directly. Such that, the bandwidth pressure is significantly reduced and the risk of terminal sensitive data information privacy leakage is reduced, too. Performing same data-time classification on the captured images and video stream by using timestamp protocol, and finally performing, on the classified images and video stream, a synchronized and distributed sub-packaging and transmission to a backend processing server.

8 Claims, 8 Drawing Sheets

(56) References Cited

U.S. PATENT DOCUMENTS

| | | | | |
|---|---|---|---|---|
| 9,516,219 B2* | 12/2016 | Okada | | H04N 23/66 |
| 10,560,609 B2* | 2/2020 | Lau | | H04N 7/188 |
| 10,666,861 B2* | 5/2020 | Sagas | | H04N 5/262 |
| 10,931,925 B2* | 2/2021 | Jeong | | H04N 23/815 |
| 10,944,955 B2* | 3/2021 | Koyama | | H04N 23/67 |
| 11,290,690 B2* | 3/2022 | Iwakiri | | H04N 21/21805 |
| 11,423,653 B2* | 8/2022 | Karoui | | H04N 21/23418 |
| 11,528,462 B2* | 12/2022 | Iwakiri | | H04N 21/21805 |
| 2008/0129649 A1* | 6/2008 | Shelby | | G06F 1/1607 |
| | | | | 345/1.3 |
| 2009/0251601 A1* | 10/2009 | Ihlefeld | | H04N 21/242 |
| | | | | 348/521 |
| 2014/0320662 A1* | 10/2014 | McNamee | | H04N 23/63 |
| | | | | 348/159 |
| 2017/0171274 A1* | 6/2017 | Wang | | H04N 23/63 |
| 2018/0131844 A1* | 5/2018 | Lau | | H04N 5/0733 |
| 2019/0215479 A1* | 7/2019 | Jeong | | G02B 5/282 |
| 2022/0417473 A1* | 12/2022 | Davidson | | H04N 7/56 |

* cited by examiner

MULTI-CHANNEL IMAGE AND VIDEO STREAM SYNCHRONIZATION AND DISTRIBUTED PROCESSING METHOD AND SYSTEM BASED ON 5G ENVIRONMENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the technical field of multi-channel image and video processing, and in particular, to a method and system for synchronized and distributed processing of multi-channel images and video streams within a 5G environment.

BACKGROUND OF THE INVENTION

The traditional cloud computing model is based on bandwidth and latency issues, and it is difficult to achieve real-time and efficient application services that support the Internet of Everything. However, the advent of edge computing technology has shown that the application services of the Internet of Everything do not need to be handed over to the cloud for processing. Instead, these services can be implemented directly through local devices, so that processing efficiency is improved and the load on the cloud is reduced. In the 5G communication environment, distributed edge computing can not only reduce bandwidth pressure during transmission, facilitate low-latency transmission, and accelerate data analysis and processing, but also improve privacy by reducing the risk of a terminal leaking sensitive data information. At the same time, network edge computing devices gradually have gained functions such as pattern recognition, predictive analysis or optimization, and intelligent processing by using collected real-time data.

When monitoring power equipment, visual perception and real-time control are important indicators of maintenance quality. The former is usually transmitted by image transmission radio, and the latter is mostly transmitted by digital radio. These methods have short-distance transmission and communication capabilities, but cannot achieve long-distance digital image transmission that is high bandwidth, high stability and ultra-low latency.

High-speed synchronous digital image collecting and processing solutions have been widely used in various related technologies to visually inspect and maintain machinery, which can greatly improve work efficiency and ensure worker safety. At present, most of the image collecting and processing systems of inspection and maintenance equipment are based on the camera-PC mode. In this mode, the camera collects/captures images, and the PC processes the images and obtains the corresponding results. Although this method can guarantee the simultaneous collection of images by multiple cameras, it is more costly and difficult to apply.

Figure 1A:
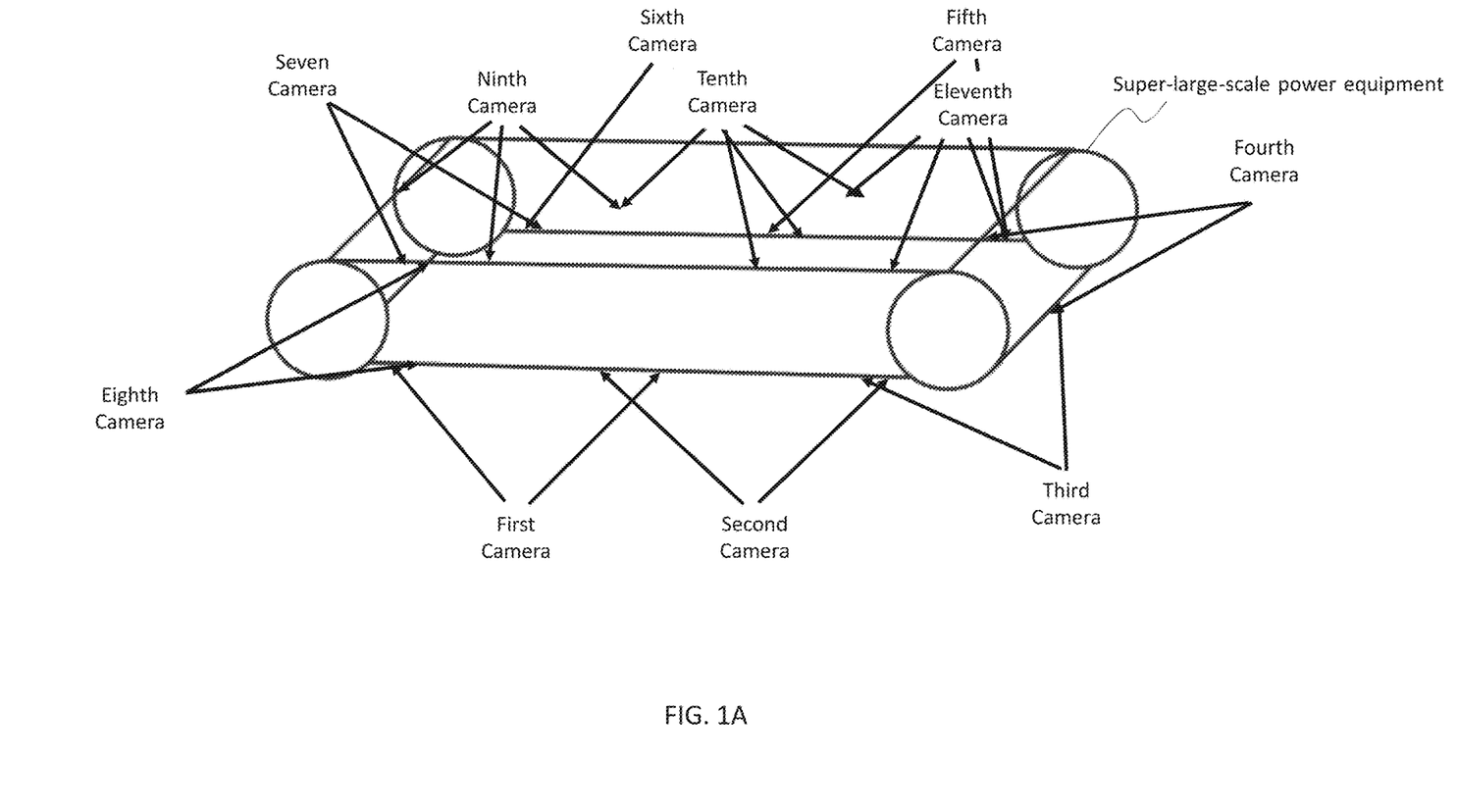
FIG. 1A is a schematic diagram of the camera arrangement structure introduced in the background of the invention.

As shown in FIG. 1A, multiple cameras (first to eleventh cameras) are installed around a piece of super-large-scale power equipment. Distributed multi-cameras need to be synchronized to obtain images and video streams at the same time. Simultaneously collecting images and videos and transmitting them as synchronized packages to a backend service processor can encounter problems such as high image and video traffic, substantial network requirements, and long delays. Therefore, distributed edge computing and distribution processing of multi-camera multi-channel collections of large numbers of images and videos, as well as real-time distributing and synchronous packaging of images and video streams and transmitting the packaged images and video streams to the backend service processor, are current power maintenance system problems that need to be solved.

SUMMARY OF THE INVENTION

The technical problem that the present invention solves is how to implement the simultaneous collection of a large number of images and videos performed by multiple-channel multiple cameras using distributed edge computing and distribution processing, real-time synchronized and distributed sub-packaging of images and video streams, while also transmitting the sub-packaged images and video streams to the backend service processor (the backend server).

In accordance with one aspect of the present invention, a computer-implemented method for synchronized and distributed processing of multi-channel images and video streams within a 5G environment is provided. The method includes the following steps: step 1, transmitting the same pulse signals to trigger multiple cameras, causing them to start simultaneously capturing images and video streams; step 2, directly performing, on the cameras locally, feature point calculation, edge non-linear trimming, and brightness equalization for each image of the simultaneously captured images and video streams; step 3, performing same data-time classification of the processed images and video streams of step 2; step 4, performing a synchronized and distributed sub-packaging for the images and video streams classified in the cameras according to timestamp protocol; and step 5, transmitting sub-packages of the images and video streams to a backend server, and performing, by the backend server, a package combination of sub-packages corresponding to the same timestamp, so as to recover each image corresponding to the same timestamp from the material captured by different cameras.

The method, by receiving the same pulse signals at the same time, starts to collect images and videos simultaneously; the distributed multiple cameras (networked multi-camera) obtain images and videos of super-large-scale power equipment via distribution at the same time; through distributed edge computing, the cameras directly and locally process the images and videos; and through shunt/distribution processing technology, any bandwidth pressure is greatly lowered, and the risk of the terminal leaking sensitive data information is reduced. Furthermore, 5G communication technology is used to achieve low-latency transmission. Moreover, based on the timestamp protocol built in the cameras, the method allows the images and videos captured by multiple cameras to be sub-packaged and transmitted synchronously according to the same data-time.

In an embodiment of the method, in step 1, the method further comprises: transmitting, by a pulse transmitter, the same pulse signals to the cameras; and controlling the speed at which the cameras simultaneously capture the images and video stream by adjusting the pulse transmitter's frequency and speed.

In an embodiment of the method, in step 1, the pulse signals comprise timestamp information.

In an embodiment of the method, each of the cameras comprises a data-collecting circuit and an image-capturing circuit, wherein the data-collecting circuit receives the corresponding pulse signal, then triggers the image-capturing circuit.

In accordance with another aspect of the present invention, a corresponding system for synchronized and distributed processing of multi-channel image and video stream based on 5G environment is provided. The system includes a pulse transmitter, a plurality of the cameras, and a backend server. The pulse transmitter is configured to transmit pulse signals. The cameras are configured to receive the pulse signals, which cause the cameras to start simultaneously capturing images and video stream in response to the received pulse signal. The cameras directly and locally perform: feature point calculation, edge non-linear trimming and brightness equalization on each image of the simultaneously captured images and video stream; same data-time classification of the processed images and video stream; and a synchronized and distributed sub-packaging for the images and video stream classified in the cameras according to timestamp protocol. Furthermore, the cameras transmit sub-packages of the images and video stream to the backend server. Then, the backend server combines a set of sub-packages corresponding to the same timestamp, so as to recover each image corresponding to the same timestamp among the images and video stream captured by different cameras.

In an embodiment of the system, the pulse transmitter transmits the same pulse signals to the cameras, and controls the speed at which the cameras simultaneously capture the images and video stream by adjusting pulse transmission frequency and speed of the pulse transmitter at the same time.

In an embodiment of the system, the pulse signals comprise timestamp information.

In an embodiment of the system, each of the cameras comprises a data-collecting circuit and an image-capturing circuit, wherein the data-collecting circuit receives the corresponding pulse signal, then triggers the image-capturing circuit.

BRIEF DESCRIPTION OF THE DRAWINGS

Embodiments of the invention are described in more details hereinafter with reference to the drawings, in which.

DETAILED DESCRIPTION

In the following description, a method and a system for synchronized and distributed processing multi-channel image and video stream based on a 5G environment and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1B:
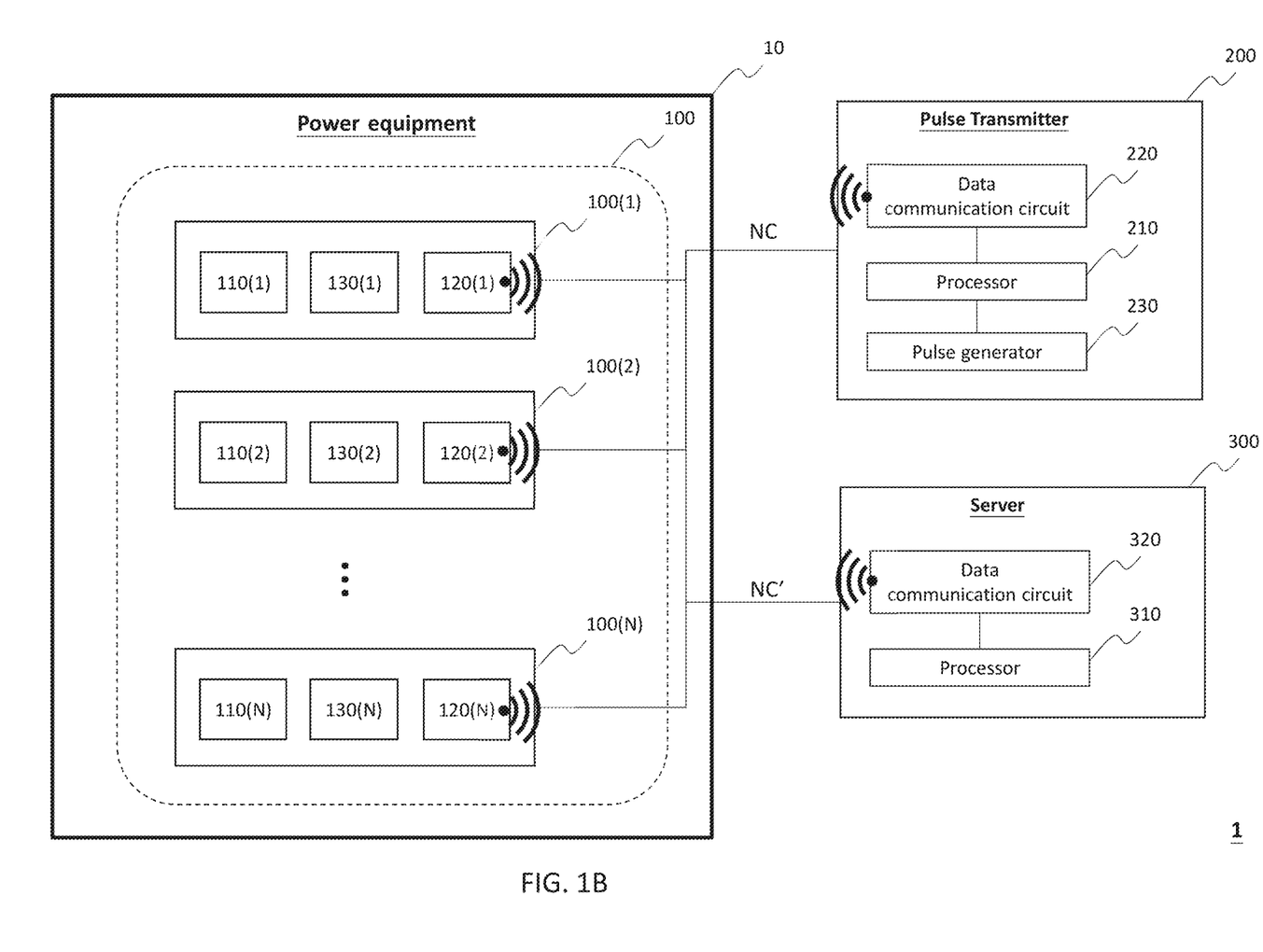
FIG. 1B is a block diagram of a provided system for synchronized and distributed processing multi-channel image and video stream based on 5G environment.

Referring to FIG. 1B, a system for synchronized and distributed processing of multi-channel images and video streams within a 5G environment includes a plurality of cameras 100 disposed in a piece of power equipment 10, one or more pulse transmitter 200 and a server 300 (also called a backend server or a cloud server). The power equipment 10 is, for example, a super-large-scale power plant.

Each of the cameras 100(1) to 100(N) includes a processor 110, a data-collecting circuit 120 (or data-communication circuit 120) and an image-capturing circuit 130, wherein N is an integer larger than 2. The data collecting circuit 120 includes a 5G communication circuit (module) or other suitable wireless communication circuit. When data collecting circuit 120 receives a corresponding pulse signal, it triggers the image-capturing circuit 130 accordingly. The triggered image capturing circuit 130 starts to simultaneously capture images and videos.

The pulse transmitter 200 includes a processor 210, a data-communication circuit 220 and a pulse generator 230. The pulse transmitter 200 is configured to transmit pulse signals. The data communication circuit 220 includes a 5G communication circuit (e.g., a wireless communication circuit supporting 5G protocol) or other suitable wireless communication circuit. The data communication circuit 220 can establish network connections NC to the cameras 100 with the data collecting circuit 120(1) to 120(N), such that the cameras 100 can be considered networked distributed cameras 100. The data communication circuit 220 is configured to transmit signals via the network connection or in a manner of paging signals. The pulse generator 230 is configured to generate a pulse signal according to the processor's instructions 210. The processor 210 control the adjustment of the frequency and the speed of the generated pulse signal. The generated pulse signal is transmitted to the cameras 100 by the data communication circuit 220.

The server 300 includes a processor 310 and a data communication circuit 320. The data communication circuit 320 is configured to establish a further network connection NC' with data collecting circuits 120. Cameras can send data through the further network connection NC' to the server 300, such that the server 300 can process the received data. The data communication circuit 320 includes a 5G communication circuit (e.g., a wireless communication circuit supporting 5G protocol) or other suitable wireless communication circuit.

Figure 2:
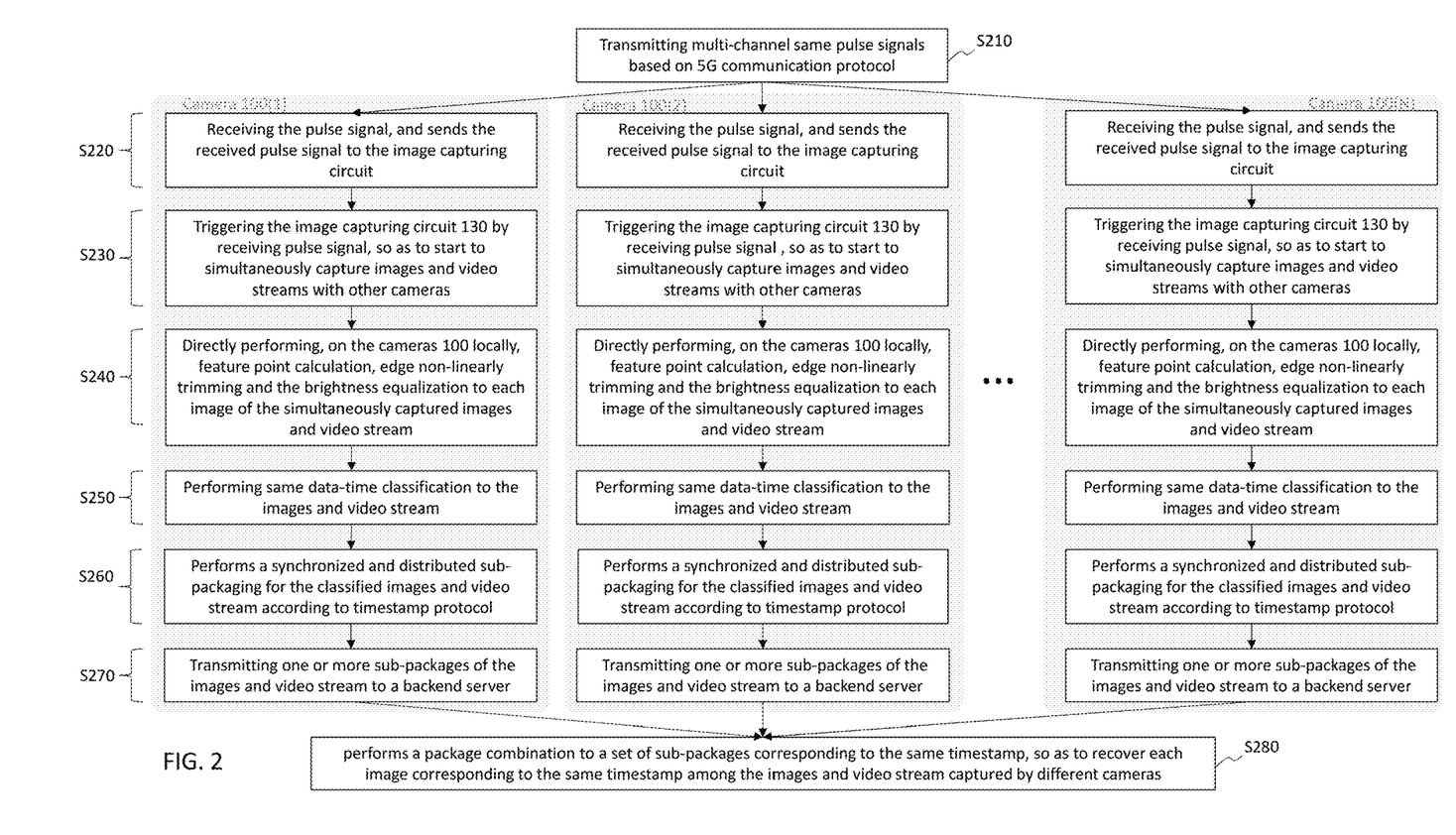
FIG. 2 is a flowchart of a provided method for synchronized and distributed processing multi-channel image and video stream based on 5G environment.
Figure 5:
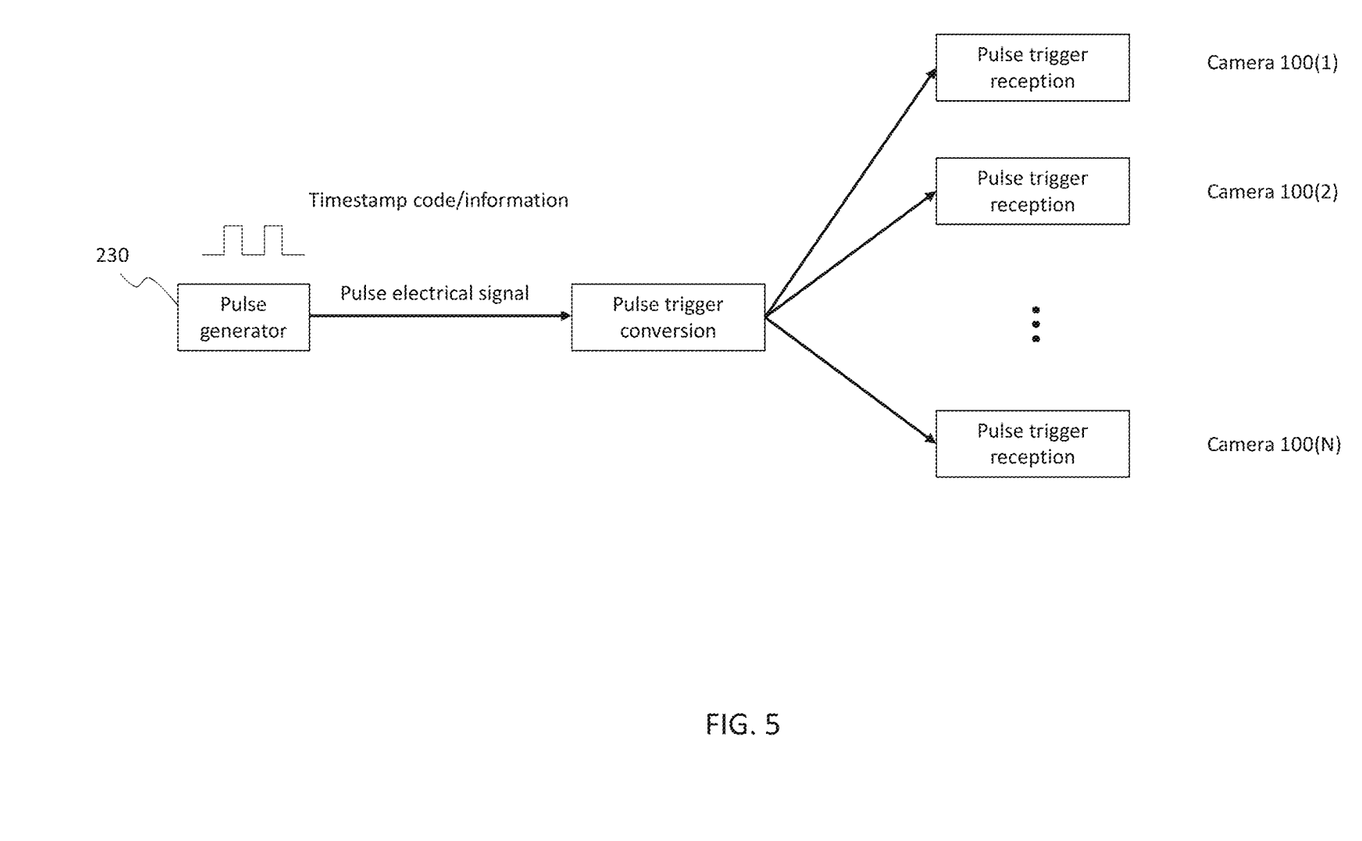
FIG. 5 is a schematic diagram illustrating a working principle of the pulse transmitter (pulse generator)

In the embodiment, referring to FIG. 2, the method for synchronized and distributed processing multi-channel image and video stream based on 5G environment includes the following steps. In step S210, a pulse transmitter 200 transmits multi-channel same pulse signals based on 5G communication protocol (as illustrated by FIG. 5). Each channel of the pulse signal is transmitted to one camera. The pulse signal includes timestamp information/code. The transmitted pulse signals can be received by cameras 100. The pulse transmitter 200 can adjust the frequency and the speed of the transmitted pulse signal.

Next, in step S220 the data-collecting circuit 120 of each camera 100 receives the pulse signal and sends it to the image-capturing circuit 130.

Next, in step S230 the image-capturing circuit 130 is triggered by receiving a pulse signal (without any delay), so as to start to simultaneously capture images and video streams.

Figure 6:
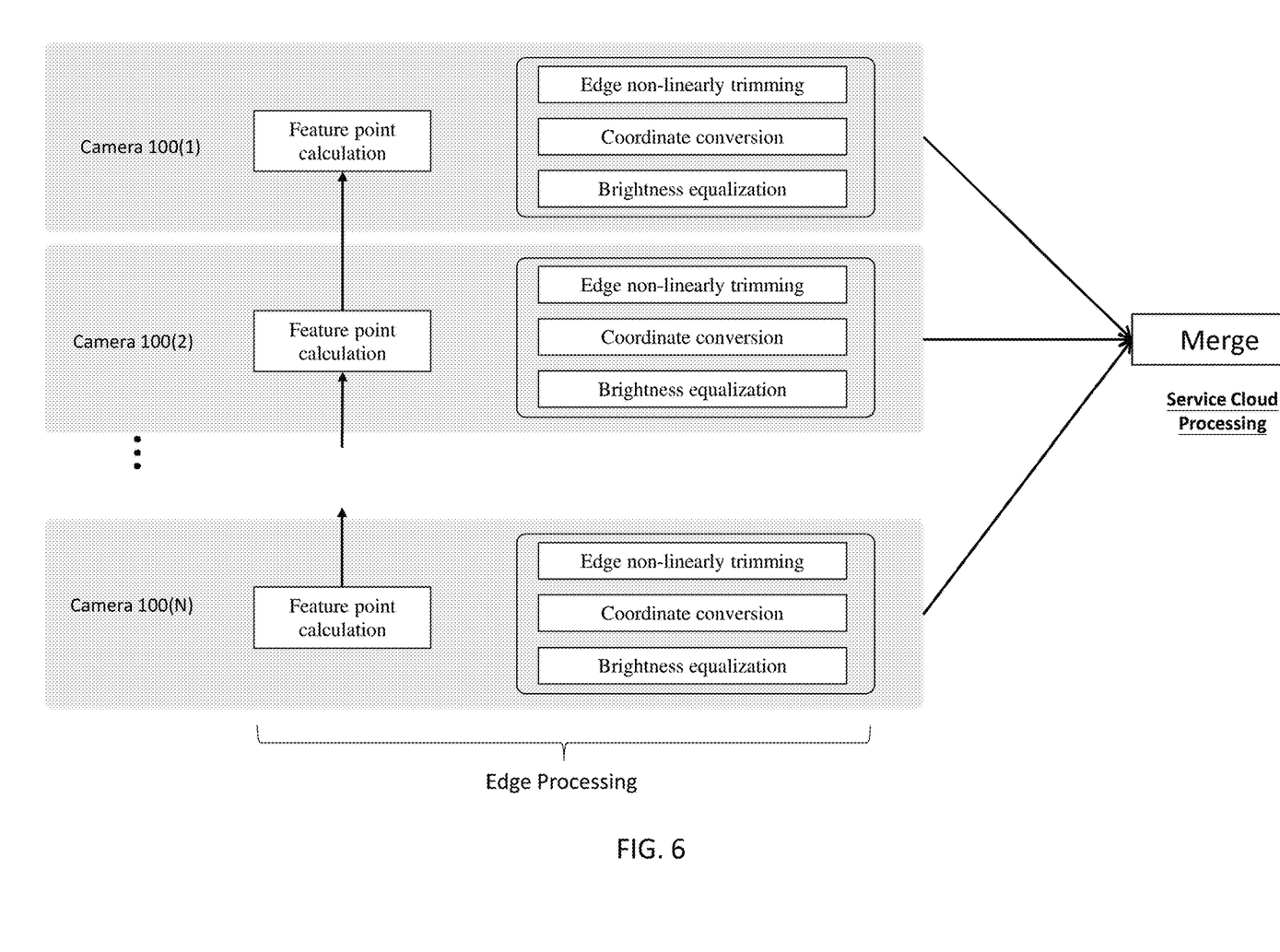
FIG. 6 is a flowchart of processing the images and videos locally in the cameras.

Next, in step S240 the processor 110 directly performs, on the cameras 100 locally, feature point calculation, edge non-linear trimming and brightness equalization for each image of the simultaneously captured images and video stream. Specifically, the processor 110 executes built-in distributed edge computing and distribution computing programs to implement the operation of step S240. Since the calculations and computing can be processed locally on each camera and the traffic of the corresponding result is divided accordingly, the large-amount output loading and bandwidth pressure are reduced (as illustrated by FIG. 6).

Next, in step S250 the processor 110 performs same data-time classification of the images and video stream. Specifically, the processor 110 executes built-in timestamp protocol to classify each of the captured images and video stream (e.g., images having the same timestamp will be classified as the same group/set).

Figure 7:
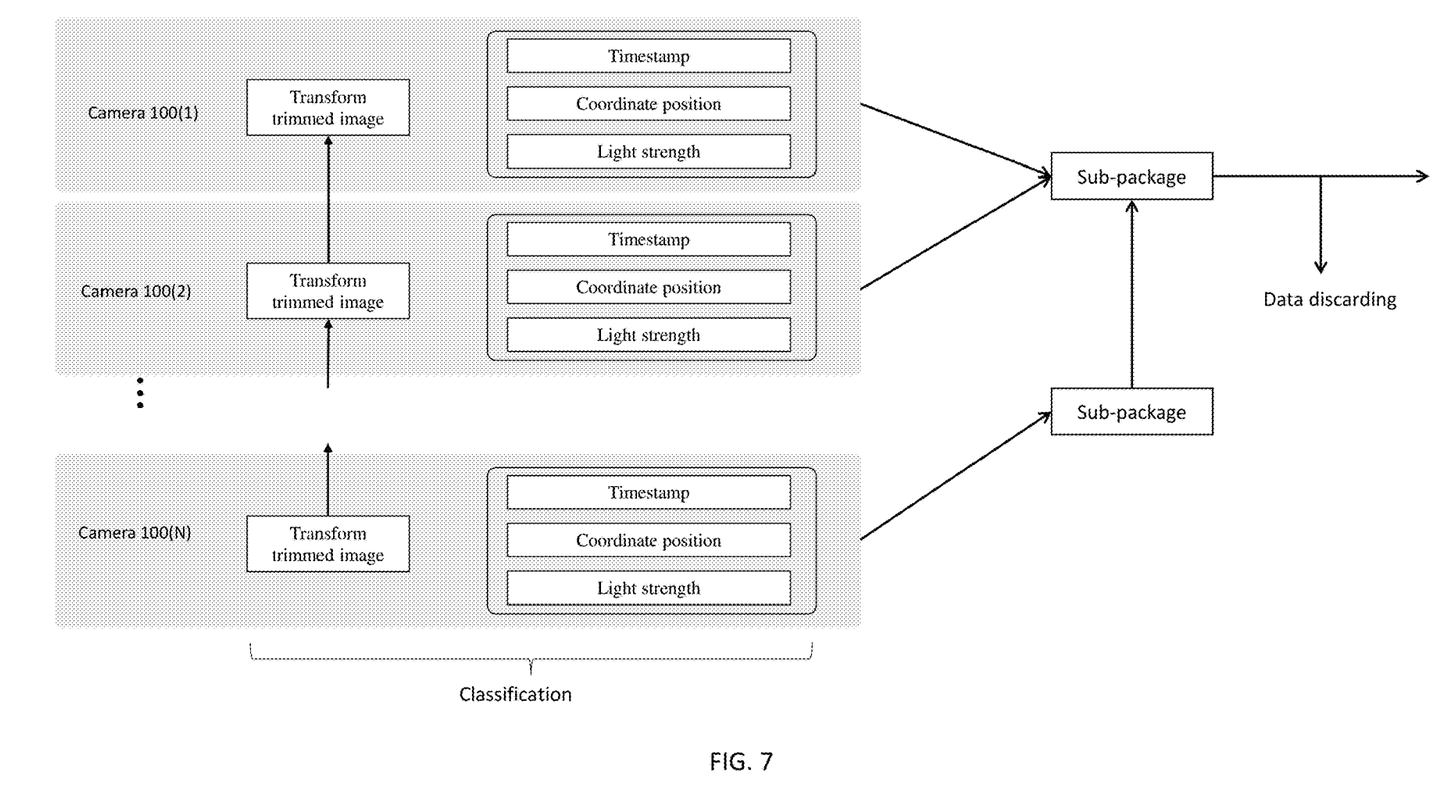
FIG. 7 is a flowchart of packaging the sub-packages corresponding to each image of the images and videos captured by different cameras.

Next, in step S260 the processor 110 performs a synchronized and distributed sub-packaging for the classified images and video stream according to the timestamp protocol (as illustrated by FIG. 7). Specifically, each image can have auxiliary information including at least one data point of the timestamp being captured, position coordinates, and light strength. The processor 110 groups images having the same timestamp in one sub-package of the images and video stream.

Next, in step S270 the data collecting circuit 120 transmits sub-packages of the images and video stream to a backend server.

Next, in step S280 the backend server 300 combines a set of sub-packages corresponding to the same timestamp, so as to recover each image corresponding to the same timestamp among the images and video stream captured by different cameras According to the foregoing provided method, the cameras 100 having the high-speed data collecting circuits (e.g., 5G communication circuit module) 120 are capable of not only implementing transmissions being low-latency, high-networked, high-bandwidth, high-reliability and high-speed, but also decreasing the pressure of the transmitting bandwidths.

The pulse transmitter 200, based on the data communication circuit 220 (e.g., 5G communication circuit module) transfer multiple channels of the same pulse signal. Furthermore, the pulse transmitter 200 can adjust pulse transmission frequency and speed to control multiple cameras the speed of simultaneously capturing images and videos.

The data collecting circuit 120 is configured to receive pulse signal. The data collecting circuit D0 is configured to transfer the received pulse signal to the image capturing circuit 130.

Figure 3:
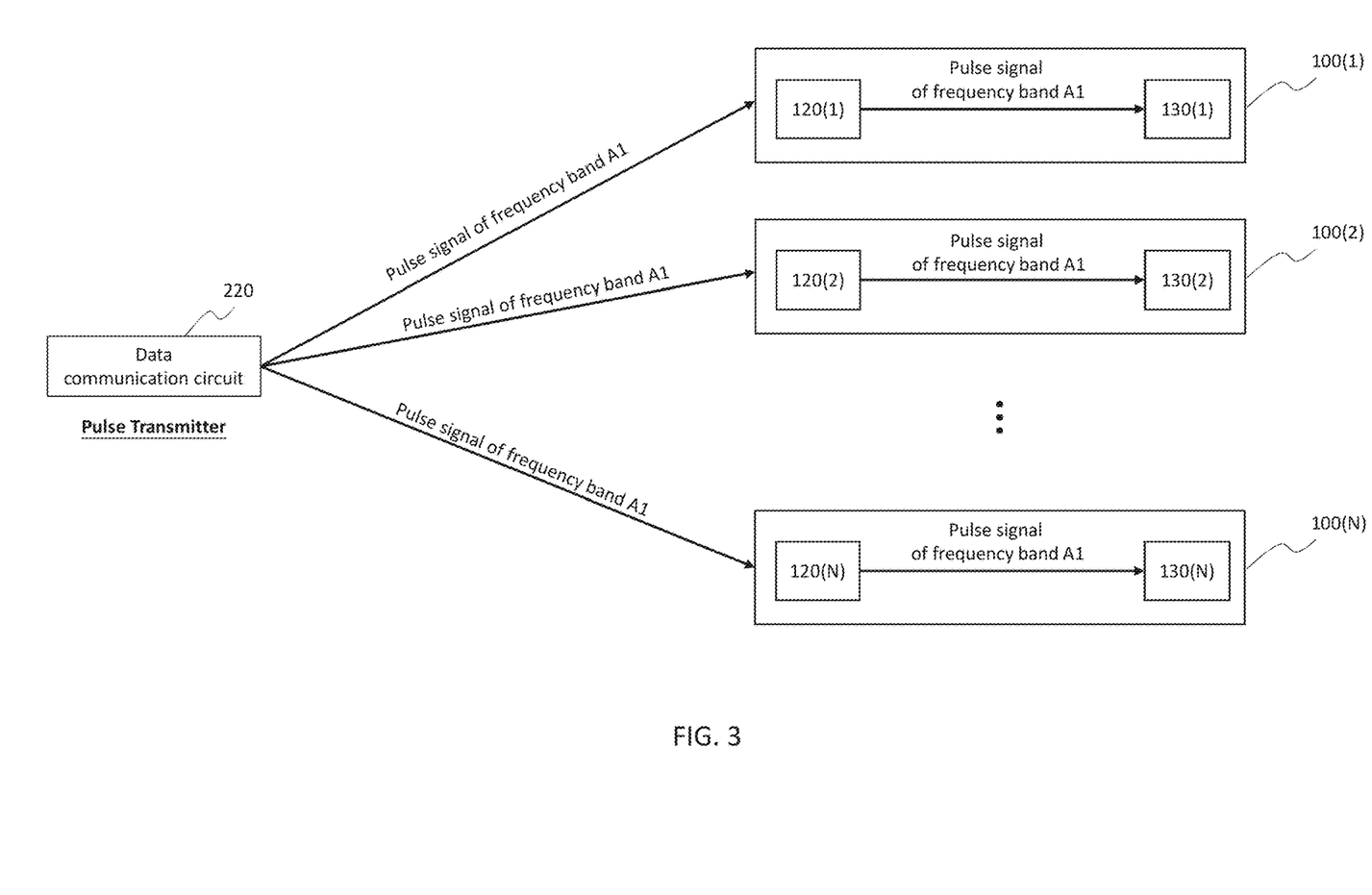
FIG. 3 is a flowchart of triggering multiple cameras.

The image capturing circuit 130 is configured to trigger a camera capturing system in response to the received pulse signal, so as to start to simultaneously capturing images and video. Specifically, based on the high-speed co-frequency triggering and real-time characteristics of timing pulse signal (the timing pulse includes timestamp information), the timing pulse signal is faster than ordinary communication protocols. As illustrated by FIG. 3, the 5G communication circuit module transmits multi-channel same-frequency-band pulse signals to data collecting circuit 120 of the cameras 100 in real-time to simultaneously trigger data collecting circuits D0 to transfer the received pulse signals to the image capturing circuits 130, such that the image capturing circuits 130 can simultaneously start to capture image corresponding to the same-frequency-band pulse signal.

Figure 4:
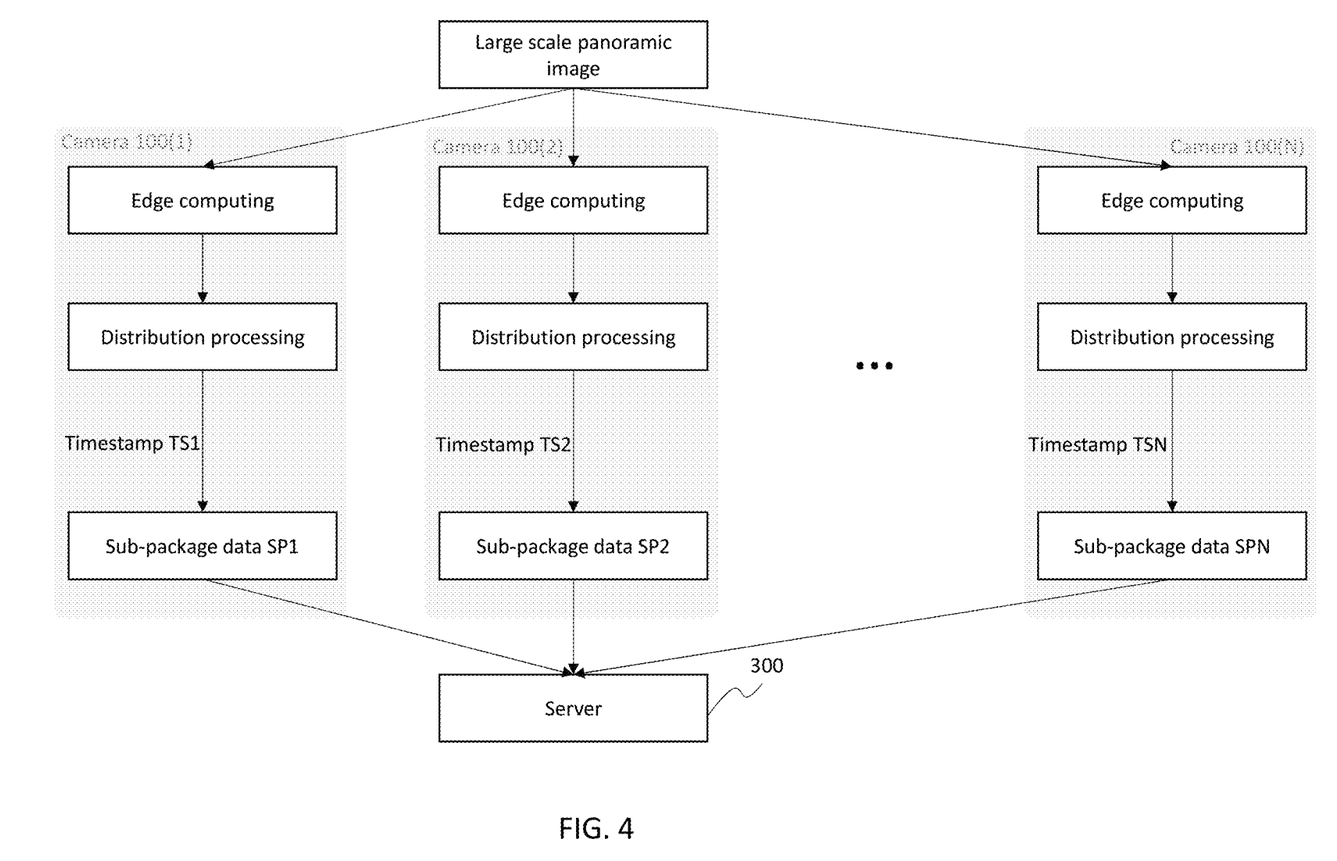
FIG. 4 is a schematic diagram illustrating a processing flow of the images and video.

The distributed edge computing and distribution computing programs is configured to distribute multi-channel traffic on multiple cameras, and to let cameras themselves process data of the images and video in a manner of distributed processing, so as to decrease the bandwidth pressure. In the operation of the distributed processing, a panoramic video is framed into multiple image frames. Then, on each image frame, the further operations including feature point calculation, non-linear edge cropping, brightness equalization, etc., are performed. The edge computing here means performing calculations related to the framed images directly on each camera, so as to implement the distributed edge computing processing of the panoramic video by multiple cameras, and the close-real-time image transmission by distributing images (as illustrated by FIG. 4).

The timestamp protocol and the timestamp information are used to perform same data-time classification on images and video synchronously captured by the cameras.

The synchronized sub-packaging program is configured to groups images having the same timestamp in one sub-package of the images and video stream, and to perform the distributed synchronized sub-package transmission. Specifically, the synchronized sub-packaging program sub-packages framed images of the synchronously captured images and video into one or more sub-packages corresponding to different timestamps according to timestamps, coordinates positions and actual condition statuses of the framed images. Then, based on communication protocol of the internal algorithm, the synchronized sub-packaging program synchronously distributes the images being performed the edge computing by the cameras 100 to the backend server 300. The backend server 300 synchronously merges the multi-channel synchronously transmitted sub-packages into the same data package, and finally achieves the effect of one package having one image (as illustrated by FIG. 4).

The 5G communication circuit module is used on low-latency, high-networked, high-bandwidth, high-reliability and high-speed transmission.

A multi-channel image and video stream synchronized and distributed processing system 1 based on 5G environment transmits, by the pulse transmitter 200, multiple-channel same pulse signals to the data collecting circuit 120. The data collecting circuit D0 transfers the received pulse signal to the image capturing circuit 130 without any delay. The image capturing circuit 130 triggers the camera capturing system to start to synchronously capture images and video. At the meantime, the networked cameras distribute traffic by multiple channels to the cameras 100, and, through distributed edge computing, directly process the captured images and video locally, so as to greatly decrease the bandwidth pressure much and to reduce the risk of the terminal's sensitive data information privacy leakage. Moreover, based on the timestamp protocol built in the cameras, perform same data-time classification on the images and videos captured by multiple cameras. Finally, based on 5G communication circuit module, the built-in sub-packaging program perform synchronously sub-package transmission to transmit the sub-packages classified according to the same data-time to the backend server 300.

Regarding the defects of the prior art, the present invention provides a multi-channel image and video stream synchronized and distributed processing system 1 based on 5G environment. The system 1, by receiving the same pulse signal at the same time, starts to capture images and video synchronously to obtain the synchronous images and videos. At the meantime, the networked multiple cameras capture the image and video data from a super-large-scale power equipment through distribution. The captured images and video are directly processed on the local cameras. Through the distributed processing technology, the bandwidth pressure is greatly reduced, and the risk of privacy leakage of sensitive data information of the terminal is reduced. The 5G communication technology is used to achieve low-latency transmission. Furthermore, based on the built-in timestamp protocol, the synchronous sub-packaging and transmission of images and video captured by multiple cameras according to the same data-time is implemented.

The present invention, through the pulse transmitter having 5G communication circuit module, distributed edge computing, timestamp protocol, synchronous sub-packaging function and 5G communication function, implements the synchronous capture of images and video of the networked multiple cameras, and low-latency, high-networked, high-bandwidth, high-reliability, and high-speed synchronously sub-packaging transmission of a large number of multi-channel images and videos. Furthermore, the provided method and system, by performing distributed edge computing and distributed processing, implement multi-camera and multi-channel synchronous capture of a large number of images and videos as well as real-time synchronous sub-packaging and transmission to the backend server, such that the speed, stability and accuracy of capturing a large number of images and video streams are greatly improved.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implement method for synchronized and distributed processing multi-channel image and video stream based on 5G environment, comprising following steps:
    step 1, transmitting same pulse signals to multiple cameras, triggering multiple cameras, and the cameras start to simultaneously capture images and video stream;
    step 2, directly performing, on the cameras locally, feature point calculation, edge non-linearly trimming and the brightness equalization to each image of the simultaneously captured images and video stream;
    step 3, performing same data-time classification to the processed images and video stream of step 2;
    step 4, performing a synchronized and distributed sub-packaging for the images and video stream classified in the cameras according to timestamp protocol, wherein each of the sub-packages further comprises auxiliary information comprising at least a timestamp, a position coordinate, and a light strength of the corresponding image;
    step 5, transmitting sub-packages of the images and video stream to a backend server; and
    step 6, performing, by the backend server, a package combination to a set of sub-packages corresponding to the same timestamp, so as to recover each image corresponding to the same timestamp among the images and video stream captured by different cameras, wherein the backend server synchronously merges the sub-packages which are multi-channel synchronously transmitted into the same data package, thereby achieving an effect of one package having one image.

2. The computer-implement method of claim 1, wherein in the step 1, the method further comprises:
    transmitting, by a pulse transmitter, the same pulse signals to the cameras; and
    controlling the speed at which the cameras simultaneously capture the images and video stream by adjusting pulse transmission frequency and speed of the pulse transmitter at the same time.

3. The computer-implement method of claim 1, wherein in the step 1, the pulse signals comprise timestamp information.

4. The computer-implement method of claim 1, wherein each of the cameras comprises:
    a data collecting circuit; and
    an image capturing circuit, wherein
    the data collecting circuit receives corresponding pulse signal, and triggers the image capturing circuit according to the corresponding pulse signal.

5. A system for synchronized and distributed processing multi-channel image and video stream based on 5G environment, comprising:
- a pulse transmitter, configured to transmit pulse signals;
- a plurality of the cameras, configured to receive the pulse signals,
  - wherein the cameras start to simultaneously capture images and video stream in response to the received pulse signals,
  - directly perform, on the cameras locally, feature point calculation, edge non-linearly trimming and the brightness equalization to each image of the simultaneously captured images and video stream,
  - perform same data-time classification to the processed images and video stream,
  - perform a synchronized and distributed sub-packaging for the images and video stream classified in the cameras according to timestamp protocol, wherein each of the sub-packages further comprises auxiliary information comprising at least a timestamp, a position coordinate, and a light strength of the corresponding image; and
- a backend server,
  - wherein the cameras transmit sub-packages of the images and video stream to the backend server, and the backend server performs a package combination to a set of sub-packages corresponding to the same timestamp, so as to recover each image corresponding to the same timestamp among the images and video stream captured by different cameras, wherein the backend server synchronously merges the sub-packages which are multi-channel synchronously transmitted into the same data package, thereby achieving an effect of one package having one image.

6. The system of claim 5, wherein:
- the pulse transmitter transmits the same pulse signals to the cameras, and
- controls the speed at which the cameras simultaneously capture the images and video stream by adjusting pulse transmission frequency and speed of the pulse transmitter at the same time.

7. The system of claim 5, wherein the pulse signals comprise timestamp information.

8. The system of claim 5, wherein each of the cameras comprises:
- a data collecting circuit; and
- an image capturing circuit, wherein
- the data collecting circuit receives corresponding pulse signal, and triggers the image capturing circuit according to the corresponding pulse signal.

* * * * *